United States Patent
Porteous et al.

(10) Patent No.: US 10,640,308 B2
(45) Date of Patent: May 5, 2020

(54) CARTON FEEDING SYSTEM AND METHOD AND RELATED CARTON FORMING AND SEALING MACHINE

(71) Applicants: David S. Porteous, Chilliwack (CA); Melvin Tsen, Coquitlam (CA)

(72) Inventors: David S. Porteous, Chilliwack (CA); Melvin Tsen, Coquitlam (CA)

(73) Assignee: WEXXAR PACKAGING, INC., Richmond, British Columbia (CA)

( * ) Notice: Subject to any disclaimer, the term of this patent is extended or adjusted under 35 U.S.C. 154(b) by 559 days.

(21) Appl. No.: 14/960,684

(22) Filed: Dec. 7, 2015

(65) Prior Publication Data
US 2016/0159026 A1 Jun. 9, 2016

Related U.S. Application Data

(60) Provisional application No. 62/088,889, filed on Dec. 8, 2014.

(51) Int. Cl.
| | |
|---|---|
| B65G 59/06 | (2006.01) |
| B65G 47/252 | (2006.01) |
| B31B 50/06 | (2017.01) |
| B31B 50/78 | (2017.01) |

(52) U.S. Cl.
CPC ......... *B65G 59/068* (2013.01); *B65G 47/252* (2013.01); *B31B 50/062* (2017.08); *B31B 50/064* (2017.08); *B31B 50/788* (2017.08); *B65G 2201/022* (2013.01); *B65G 2201/025* (2013.01)

(58) Field of Classification Search
CPC . B31B 1/06; B31B 2201/0276; B31B 50/062; B31B 50/064; B31B 50/788; B65G 59/068; B65G 47/252; B65G 2201/022; B65G 2201/025; B65G 59/06; B65B 43/205; B65B 43/265; B65B 43/20; B65B 43/26
USPC .............................. 493/126; 414/796.4, 801
See application file for complete search history.

(56) References Cited

U.S. PATENT DOCUMENTS

| | | | | |
|---|---|---|---|---|
| 2,989,903 | A | * | 6/1961 | Wilcox ................. B65B 43/285 493/319 |
| 3,564,980 | A | | 2/1971 | Winters |
| 3,747,482 | A | | 7/1973 | Berney |
| 3,991,660 | A | * | 11/1976 | Calvert ................. B65B 43/285 493/316 |
| 4,011,799 | A | * | 3/1977 | Chidsey ................. B31B 50/00 493/314 |
| 4,170,929 | A | * | 10/1979 | McDowell ............ B65B 43/185 493/313 |
| 4,213,285 | A | | 7/1980 | Mancini |
| 4,498,893 | A | | 2/1985 | Odom |
| 4,553,954 | A | | 11/1985 | Sewell et al. |
| 4,857,038 | A | | 8/1989 | Tacchini |

(Continued)

*Primary Examiner* — Michelle Lopez
*Assistant Examiner* — Chinyere J Rushing-Tucker
(74) *Attorney, Agent, or Firm* — Thompson Hine L.L.P.

(57) ABSTRACT

A carton feeding assembly includes a carton blank storage rack for holding a stack of horizontally oriented folded carton blanks, a carton blank transport device for picking a bottommost folded carton blank from the stack and conveying it along a conveyance path, and a carton blank push up device that reorients the folded carton blank into an upright position suitable for movement into engagement with a case erector.

19 Claims, 13 Drawing Sheets

(56) References Cited

U.S. PATENT DOCUMENTS

| | | | |
|---|---|---|---|
| 4,915,678 A | 4/1990 | Morita | |
| 5,156,582 A * | 10/1992 | Thompson | B31B 50/00 |
| | | | 493/117 |
| 5,440,852 A | 8/1995 | Lam | |
| 5,480,371 A | 1/1996 | Morita et al. | |
| 5,531,661 A * | 7/1996 | Moncrief | B65B 43/265 |
| | | | 493/313 |
| 5,588,643 A * | 12/1996 | Tagliaferri | B31B 50/00 |
| | | | 271/10.07 |
| 5,772,568 A | 6/1998 | Chen | |
| 5,813,965 A * | 9/1998 | Mitchell | B31B 50/80 |
| | | | 493/315 |
| 6,080,095 A | 6/2000 | Chen | |
| 6,309,335 B1 * | 10/2001 | Holton | B31B 50/00 |
| | | | 493/120 |
| 6,319,183 B1 | 11/2001 | Ballos, III | |
| 6,915,622 B2 | 7/2005 | Spatafora | |
| 6,929,593 B1 | 8/2005 | Chen | |
| 6,971,980 B2 | 12/2005 | Chiu Chen | |
| 7,131,941 B2 | 11/2006 | Makar et al. | |
| 7,192,393 B2 | 3/2007 | Makar et al. | |
| 7,311,650 B2 | 12/2007 | Makar et al. | |
| 7,510,517 B2 | 3/2009 | Goodman | |
| 7,828,708 B2 | 11/2010 | Huang et al. | |
| 2004/0162207 A1 * | 8/2004 | Ruf | B65B 43/185 |
| | | | 493/309 |
| 2006/0096712 A1 | 5/2006 | Makar et al. | |
| 2007/0072757 A1 * | 3/2007 | Goodman | 493/313 |
| 2007/0082799 A1 * | 4/2007 | Makar | 493/309 |
| 2007/0128898 A1 | 6/2007 | Makar et al. | |
| 2009/0239726 A1 * | 9/2009 | Huang | B31B 50/00 |
| | | | 493/309 |
| 2012/0100976 A1 * | 4/2012 | Graham | B31B 3/00 |
| | | | 493/52 |
| 2014/0073497 A1 * | 3/2014 | Mack | B31B 1/00 |
| | | | 493/151 |
| 2015/0031517 A1 * | 1/2015 | Cavazza | B31B 1/06 |
| | | | 493/124 |

* cited by examiner

CARTON FEEDING SYSTEM AND METHOD AND RELATED CARTON FORMING AND SEALING MACHINE

CROSS-REFERENCES

This application claims the benefit of U.S. Provisional Application Ser. No. 62/088,889, filed Dec. 8, 2014, which is incorporated herein by reference.

TECHNICAL FIELD

This application relates to a method to transporting folded carton blanks for a carton forming and sealing machine and, more particularly, to a method to store and transport a stack of horizontally oriented folded carton blanks by a conveying belt to a carton blank opening device without stopping the machine in order to refill the folded carton blanks into the carton blank storage rack and adjust the position of the carton blanks to avoid jams.

BACKGROUND

In the packaging industry carton blank feeding systems generally involves moving a stack of vertically oriented carton blanks. Carton blank feeding devices used in known carton forming machines, in general are one of two types.

In the first type, the carton blank feeding device uses two parallel carton blank holding arms extended outwards from the entrance of the carton forming machine. The two carton blank holding arms are mounted at the front of the carton forming machines at 45° to vertical, and two pusher arms are connected with the two parallel carton blanks holding arms. At the lower end of each of the pusher arms, a heavy metal weight hangs. In use, a stack of vertically oriented folded carton blanks is placed in the parallel blank holding arms, the two sides of the carton blanks are held by the holding arms, and at the back of the carton blanks, the pusher arm is attached at the last carton blank. The gravity force and the 45° slant slide the carton blanks towards the carton forming device.

In the second type, the feeding device uses a set of two long carton blanks supporting arms, which are parallel to each other and mounted on the front end of the carton forming machine. In the middle of the bottom of the two long carton blanks supporting arms, two conveyor belts are mounted. A pusher arm is also mounted at one of the carton blanks supporting arms. In use, the carton blanks are placed in the space between the two long carton blanks supporting arms and the carton blanks are driven to the carton forming machine by the conveyor belts. The pusher arm with sensors will push the carton blanks towards the machine.

The problems of these two types of carton blank feeding systems are that, first of all, when the carton blanks are running out, a worker needs to stop the machine to refill the carton blanks into the feeding device. Frequently stopping the machine means waste of production time. Also, use of the gravity force and the 45° slant to slide the carton blanks can cause blanks to jam, especially when the number of carton blanks is low such that the carton blanks are not heavy enough to smoothly slide to the machine. Secondly, after a stack of vertically folded blanks is loaded, a manual adjustment/check must be done to ensure that the blanks are in the right position for the blanks to open. If the carton blanks are not in the right position, the machine will jam. This kind of adjustment is time consuming and decreases the productivity of the machine. Thirdly, another disadvantage of feeding stacks of vertically oriented carton blanks is that because the carton blanks stand in the feeder on the carton flaps, the quality of the carton and the weight of the blanks may cause the carton blanks to resist movement in the feeder and jam. Further, if a user wants to load more carton blanks into the feeder at one time to increase capacity between reloading, the carton blank feeder needs to be longer, which requires more floor space.

Accordingly, it would be desirable to provide a method to store and transport the folded carton blanks to the carton blanks opening device without stopping the machine, and/or to adjust the stack of folded blanks and/or to eliminate or reduce the need for further floor space in order to load larger volumes of carton blanks.

SUMMARY

In one aspect, a carton forming and sealing machine includes a storage rack holding device for holding a stack of horizontally oriented folded carton blanks, a carton blank transport device for picking a folded carton blank from the bottom of the stack and carrying it to a carton blank push up device that reorients the folded carton blank from the horizontal orientation to an upright orientation.

In another aspect, a carton feed assembly is provided for delivering folded cartons to a carton erecting mechanism. The assembly includes a carton blank storage rack, a carton blank transport device and a carton blank push up device. The carton blank storage rack holds a carton blank stack formed by plurality of folded carton blanks. The folded carton blanks are stacked vertically one atop another such that additional folded carton blanks can be added to the top of the carton blank stack. The carton blank transport device is arranged below the carton blank stack and configured to pick a bottommost folded carton blank from the bottom of the stack and transport it along a conveyance path toward a carton erecting mechanism. The carton blank push up device is located toward an end of the conveyance path that receives the folded carton blank and reorients the folded carton blank from a substantially horizontal orientation to an upright orientation.

In a further aspect, a carton feed assembly is provided for delivering folded cartons to a carton erecting mechanism. A carton blank transport device is configured to move a substantially horizontally oriented folded carton blank along a conveyance path into abutting engagement with or close proximity to a carton blank lift rail. The carton blank lift rail includes an upwardly facing slot below the folded carton blank. A pivot device below the folded carton blank is movable to pivot the folded carton blank upward from the substantially horizontal orientation into an upright orientation in which a bottom edge of the folded carton blank seats into the upwardly facing slot of the carton blank lift rail.

In one detailed example, a carton blank feeding system is mounted in the carton forming and sealing machine, which is located at the front of the machine. The carton blank feeding system includes a carton blank storage rack. The carton blank storage rack allows a stack of horizontally-oriented folded carton blanks to be easily loaded therein by simply adding more carton blanks to the top of the existing stack. Accordingly, adding more carton blanks into the rack only makes the stack of carton blanks higher and does not generate a need for more floor space to extend the capacity rack for to receive more blanks. The carton blank storage rack may have four long flat metal bars mounted on two different shape metal plate/metal bar. In the middle, under the carton blank storage rack, a carton blank transport device is mounted. The carton blank transport device has a conveyor belt driven by a motor. The speed of the conveyor belt can be adjusted to determine how many carton boxes will be formed within one minute. On the conveyor belt, at least one lug is mounted. The lug or lugs is/are used to push the flap of the horizontal carton blank towards the carton blank push up device. The number of lugs depends on how many carton blanks the user wants to open within a minute, the more carton blanks to open, the more the lugs are needed. The carton blank push up device is composed of a pair of triangular shaped metal plates, a set of two suction cups, each suction cup mounted on the triangular shaped metal plate separately; a flat plate with small rectangular "⌐" shaped bars, one dual rod cylinder and one adjustable stopper. When the horizontal folded carton blanks are transported to the surface of the carton blank push up device, the suction cups will grip the blanks, hold the blanks firmly, and push the carton blanks from the horizontal position to a vertical position. The flap of the carton blanks will be pushed into the groove formed by the small rectangular "⌐" shaped bars mounted on the flat plate, in order to ensure the right position of the blanks for the pin block set to open the blank. The dual rod cylinder mounted on an "L" shaped long metal bar will push the side of the carton blank toward the adjustable stopper to ensure the blank is right under the jaw plate. The jaw plate will open the carton blanks. At the lower end of the jaw plate, a flat metal plate is mounted to prevent the carton blanks from falling backwards when the suction cups releases the carton blanks and returns to the horizontal position for pushing another carton blank upright.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 10-11 and 11a are side views of the carton blank feeding system showing transportation of carton blanks to the carton blanks erecting device;

DETAILED DESCRIPTION

Figure 12:
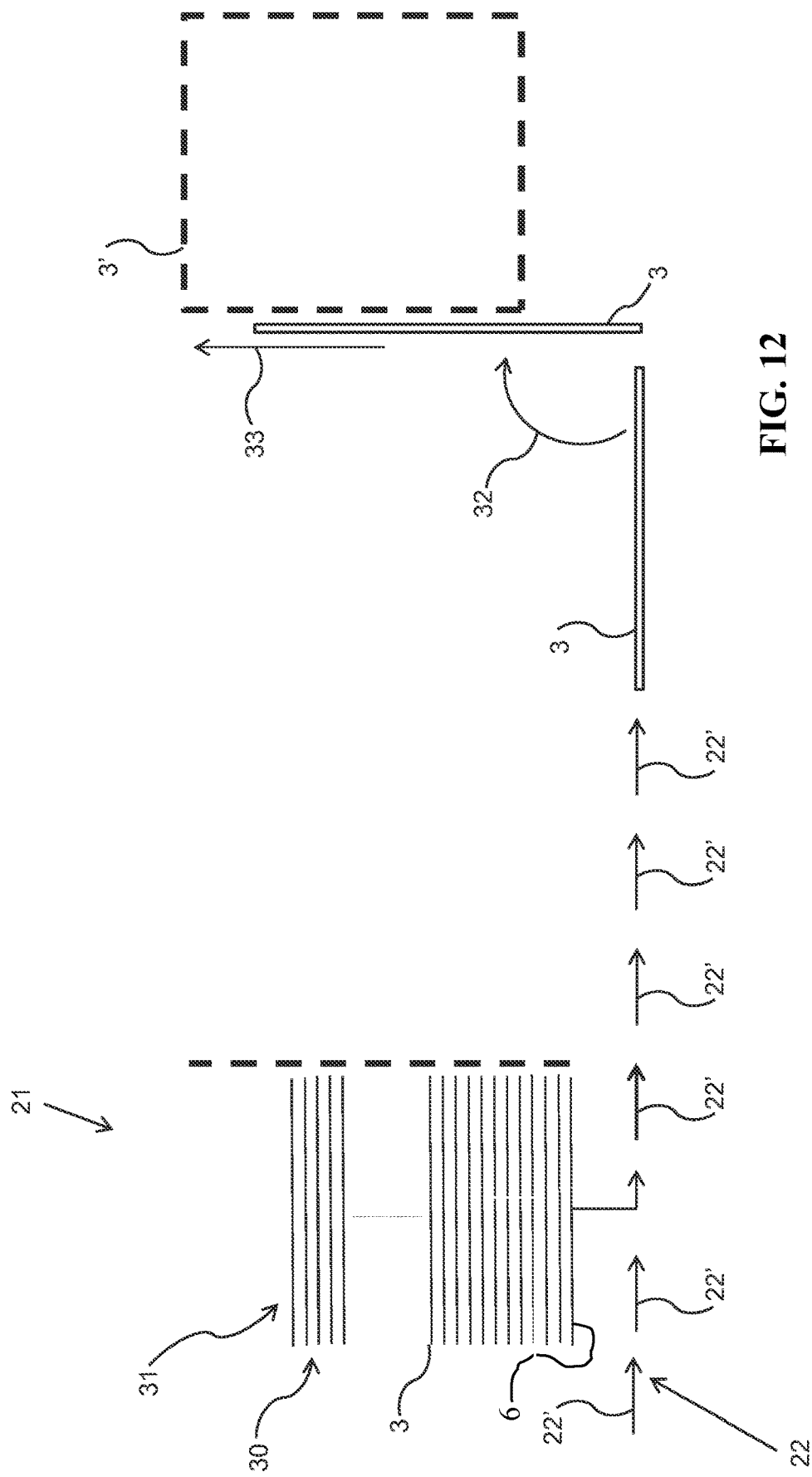
FIG. 12 shows a schematic depiction of an operating sequence of one embodiment of a carton blank feed assembly.

Referring first to FIG. 12, the basic operation of a carton feed assembly is shown schematically. A carton blank storage station or area 21 contains a carton blank stack 30 formed by plurality of folded carton blanks 3, where each of the folded carton blanks 3 is in a substantially horizontal orientation (e.g., offset from horizontal by no more than about twenty degrees, such as no more than about fifteen degrees). The folded carton blanks 3 are stacked vertically one atop another as shown such that additional folded carton blanks can be added to the top 31 of the carton blank stack 30. The carton blank storage station 21 may take any suitable form. Generally, the top of the stack is maintained open so that additional folded carton blanks can be added to the stack even as the feed assembly is operating to pick blanks from the stack and convey them toward an erecting mechanism. In this regard, a carton blank transport device 22 (shown here generically by the horizontally extending arrows 22') is arranged below the carton blank stack 30 and is configured to pick a bottommost folded carton blank from the bottom of the stack (as reflected by arrow 22") and transport it along a conveyance path toward a carton erecting mechanism (not shown), the configuration of which can vary widely.

As shown, the folded carton blank 3 remains in its substantially horizontal orientation as it is conveyed. Toward the end of the conveyance path, a carton blank push up device (not shown) receives the folded carton blank 3 and reorients the folded carton blank from the substantially horizontal orientation to an upright orientation (e.g., offset from vertical by no more than about twenty degrees, such as no more than about fifteen degrees) as indicated by arrow 32. The push up device may take any suitable configuration that facilitates the reorientation of the folded carton blank. Once moved into the upright position, the folded carton blank can then be moved upward into engagement with the carton erecting mechanism as indicated by arrow 3. The carton erecting mechanism opens the box as suggested be the open carton blank form shown at 3'. The opened carton blank can then be further processed into form suitable for packaging (e.g., by closing the bottom flaps and then taping the bottom flaps closed).

In one example of the carton feed assembly, one or more upright members at least partially frame the storage area (e.g., to define both a downstream edge of the storage area and a side edge of the storage area so as to provide a corner section into which folded carton blanks 3 being added to the top of the stack 31 can be pushed in order to properly orient the folded carton blanks in the stack).

In one example of the carton feed assembly, the carton blank transport device may include a push lug that is moved along the conveyance path beneath the stack by a loop conveyor (e.g., a belt or chain). The carton blank storage area includes at least one stop along the conveyance path, with a lower edge of the stop positioned to retain folded carton blanks that are above the bottommost folded carton blank 6 as the push lug moves the bottommost folded carton blank below the lower edge of the stop. In one implementation, the stop may be formed by one or more the upright members that frame the storage area.

In one example of the carton feed assembly, a carton blank push up device that grips a downward facing side of the folded carton blank 3 using one or more suction members may be used, and a lift rail may be provided with a blank receiving slot into which the folded carton blank is loaded when it is pivoted into the upright position. The lift rail then moves the folded carton blank upward per arrow 33.

Figure 13B:
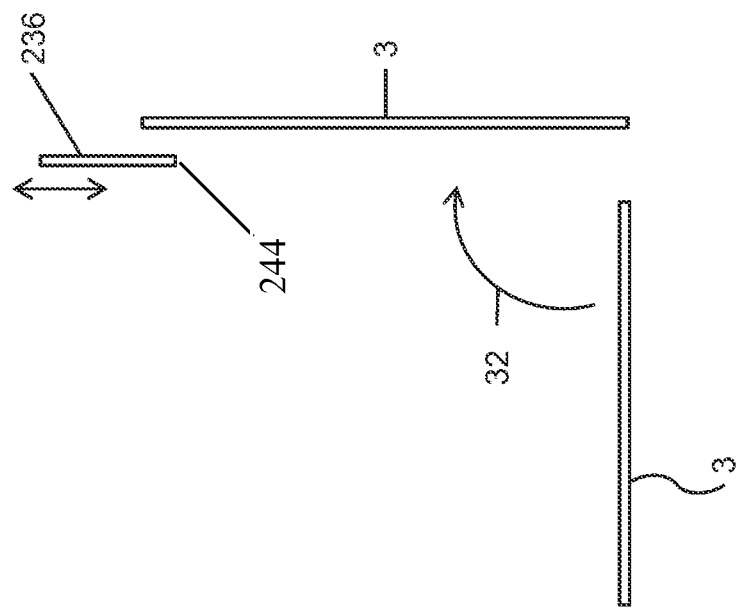
FIGS. 13a and 13b show a schematic depiction of retaining rail operation in one embodiment of a carton blank feed assembly.
Figure 13A:
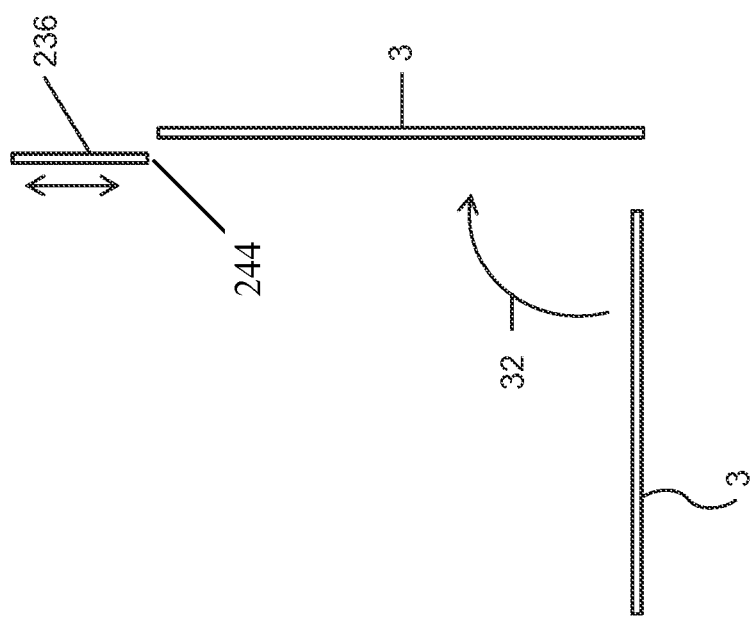

As shown schematically in FIGS. 13a and 13b, in one example, a retaining rail 236 is spaced vertically above the aforementioned lift rail. The retaining rail 236 is movable between a raised position (shown in FIG. 13a) and a lowered position (shown in FIG. 13b). The raised position allows the folded carton blank 3 to clear a lower edge 244 of the retaining rail 236 when the carton blank is pivoted upward into the upright position. In the lowered position the lower edge 244 of the retaining rail 236 is moved downward alongside a top portion of the folded carton blank and at the upstream side of folded carton blank relative to the conveyance direction so as to prevent the folded carton blank 3 from pivoting back downward.

Generally then, a method of handling carton blanks in a carton forming and sealing machine involves the steps of: (a) storing a plurality of substantially horizontally oriented folded carton blanks in a stack at a carton blank station; (b) automatically picking a folded carton blank from the bottom of the stack and conveying it in substantially horizontal orientation along a conveyance path in a conveyance direction toward a carton erecting mechanism; and (c) automatically pivoting the folded carton blank of step (b) upward into an upright orientation before opening the folded carton blank. Steps (b) and (c) may be repeated for multiple folded carton blanks in the stack. More folded carton blanks are loaded at the carton blank loading station by adding the folded carton blanks to the top of the carton blank stack while steps (b) and (c) are continuously carried out in a repeated manner. In one embodiment, in step (c) the pivoting operation loads the folded carton blank into a receiving slot in a lift rail, and the method further involves: (d) moving the lift rail upward to push the folded carton blank into engagement with a carton erecting mechanism that operates to open the folded carton blank.

Referring now to FIGS. 1-11 and 11a, a detailed implementation of one embodiment is shown and described, it being understood that variations on many of the details are possible and contemplated. In FIG. 1a perspective view of the carton forming and sealing machine 1 is shown. At the front part (left, in the figures) of the carton forming and sealing machine 1 is the folded carton blank feeding system 2 which includes a carton blank storage rack 21, a carton blank transport device 22 and a carton blank push up device 23. The carton blank storage rack 21 has four long, flat, vertically-oriented metal bars 211. Two long flat metal bars 211 are mounted vertically on a horizontal metal plate 212 and at the adjacent side, another two long flat metal bars 211 are mounted on a "L" shaped long metal bar 213. Another "L" shape long metal bar 214 is parallel to "L" shaped long metal bar 213. Behind or at the end of the "L" shaped long metal bar 213, a stopper 62 is mounted on a metal plate (not shown in the Fig), and the metal plate is mounted on the body frame. Both "L" shaped long metal bar 213, 214 and the four long, flat metal bars 211 form a horizontal carton blank storage rack to retain the horizontally oriented folded carton blanks 3 in the storage rack 21.

Figure 4:
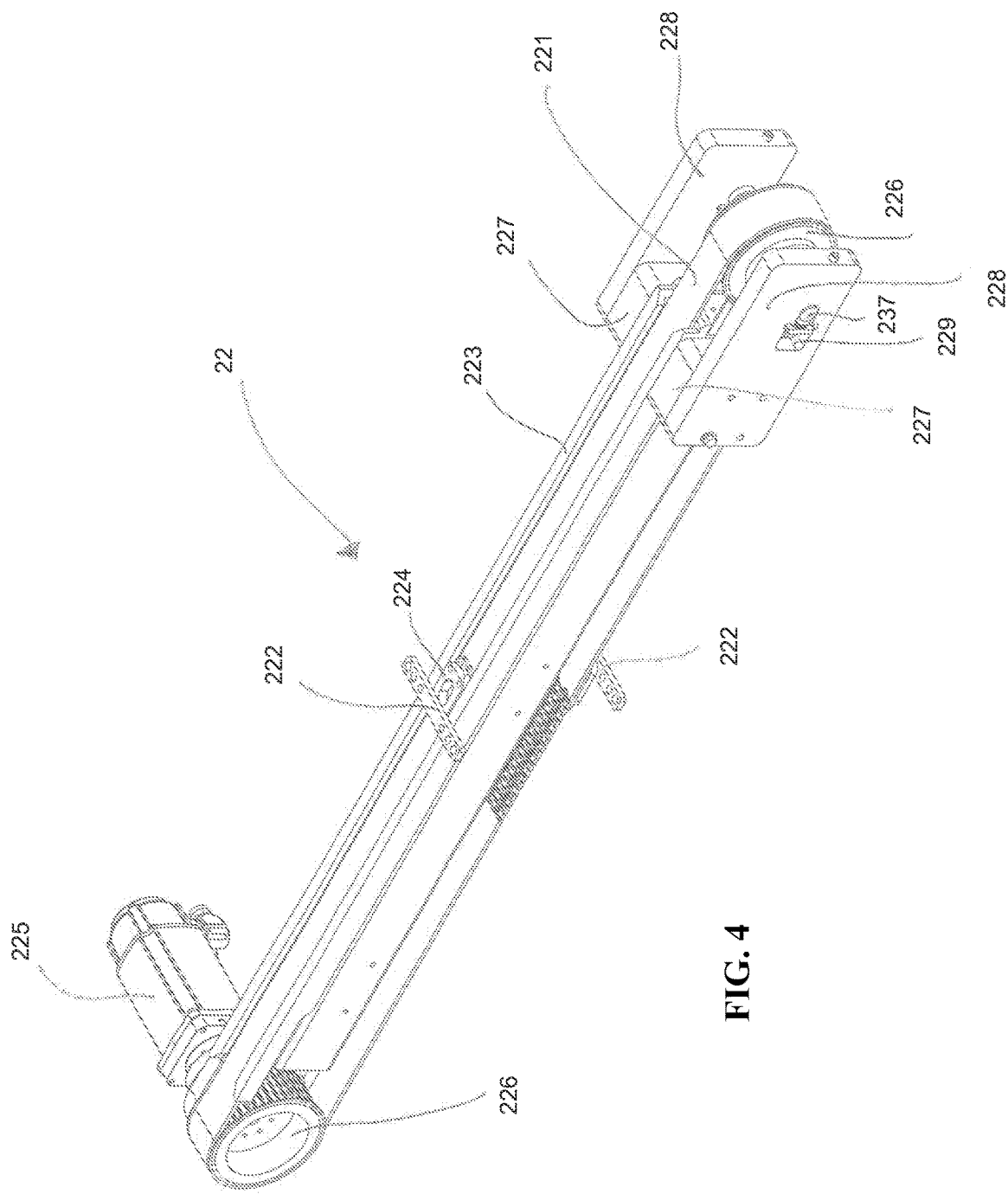
FIG. 4 is a perspective view of a carton blank transport device.

A carton blank transport device 22 includes a motor 225 which is linked with a gear system 226 (see also FIG. 4). The gear systems includes two gears 226. One gear 226 links with the motor 225 to drive a conveyor belt 221 to move the conveyor belt 221 forward and one gear 226 located at the end of the conveyor belt 221 to help to move the conveyor belt 221. The conveyor belt 221 passes underneath the carton blank storage rack 21. On the surface of the conveyor belt 221, at least one lug 222 is mounted. The lug 222 pushes the bottom carton blank 6 of a pile of horizontal folded carton blanks 3 out of the carton blank storage rack 21, downstream toward the carton blank push up device 23. In this regard, the lower edges of the upright members 211 on plate 212 may be positioned to allow just the bottommost folded carton blank of the stack to be shifted along the conveyance path. When the bottommost folded carton blank clears the stack, gravity causes the carton blank stack to move downward so that the next folded carton blank is in position to be picked and conveyed by the lug 222. The conveyor belt 221 may be placed in the "U" shaped flat bar 223. The folded carton blank may be supported by horizontal surface portions of the plates 213, 214, as well as horizontal surface portions of bar 223, as the folded carton blank is pushed along the conveyance path by the lug. It is recognized that, as an alternative, one or more roller members may be provided on the plates 213, 214 to facilitate the conveyance is as well. The upright portions of plates 213, 214 helps to retain the folded carton blank against lateral movement as it is conveyed.

In the figures, the carton blank push up device 23 is composed of a pair of suction cups 231. Suction cups 231 are mounted on the top end of two triangular shaped metal plates 232 (best seen in FIG. 5). The triangular shaped metal plates 232 are connected with pneumatic cylinders 233. On the two sides of the suction cups 231, an adjustable stopper 62 and a dual rod cylinder 63 are mounted. The erecting system has a jaw plate 4, which may be similar to that of U.S. Pat. No. 4,553,954, or later variations such as those shown in U.S. Pat. Nos. 7,131,941, 7,192,393 or 7,422,552. At the back of the machine is a bottom tape sealing device 43 which is also a known technology.

Figure 2:
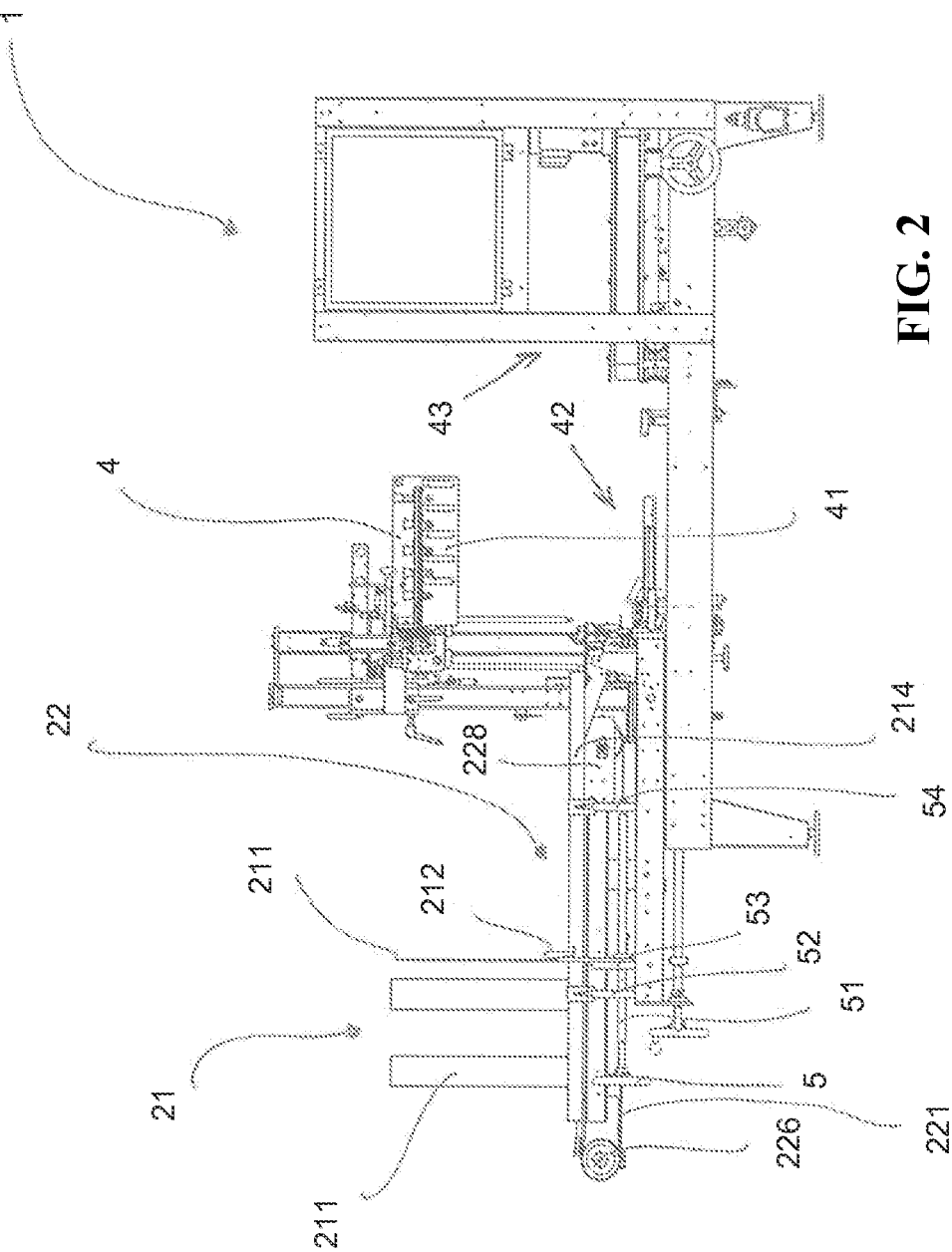
FIG. 2 is a side view of the carton forming and sealing machine.
Figure 3:
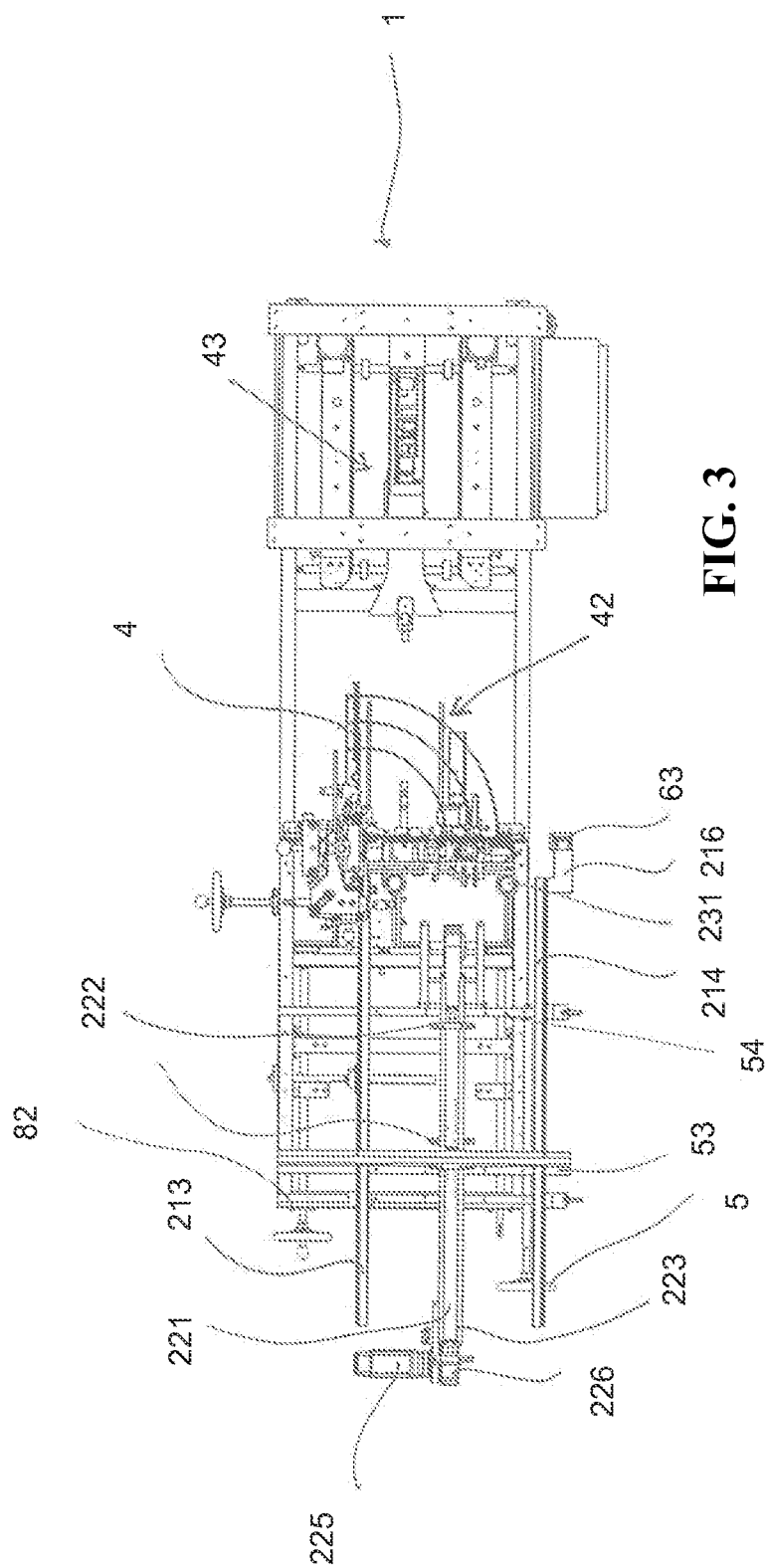
FIG. 3 is a top view of the carton forming and sealing machine.

Referring to FIGS. 2-3, side and top views of the carton forming and sealing machine 1 are shown. As seen, the carton blank storage rack 21 is mounted on the top of the carton blank transport device 22 and at the end of the carton blank transport device 22 is the carton blank push up device 23.

FIG. 4 is a perspective view of the carton blank transport device 22. The carton blank transport device 22 has a conveyor belt 221 and at least one lug 222 is fixed on the conveyor belt 221. The number of lugs 222 is based on the number of carton blanks per unit time intended to be sent to the pin block set 4. In detail, the lug 222 is fixed on a small metal carrier 224 that is mounted on the conveyor belt 221. The conveyor belt 221 may be mounted within the "U" shape flat bar 223. Both ends of the conveyor belt 221 are mounted on gears 226. At the front end of the conveyor belt 221, a motor 225 is connected with one gear 226. At the back of the conveyor belt 221, the gear 226 is connected with two rectangular plates 228 by a long rod 237. The long rod 237 is supported in the hole 229 so that the gear 226 can move. The two rectangular shape plates 228 are connected with two small square shape blocks 227 and the two small square shape block 227 are mounted on the two sides of the "U" shape flat bar 223.

Figure 1:
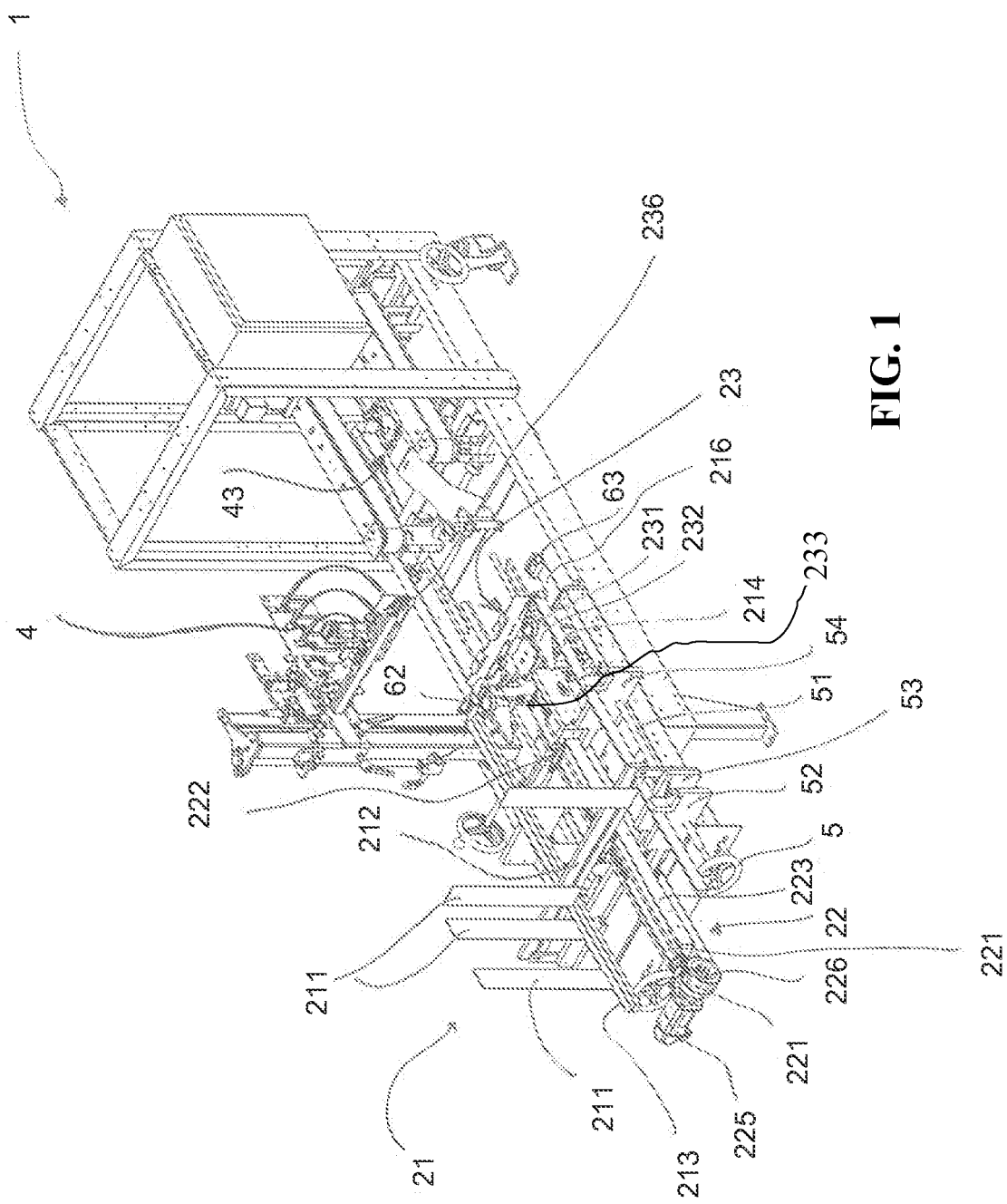
FIG. 1 is a perspective view of the carton forming and sealing machine.
Figure 5:
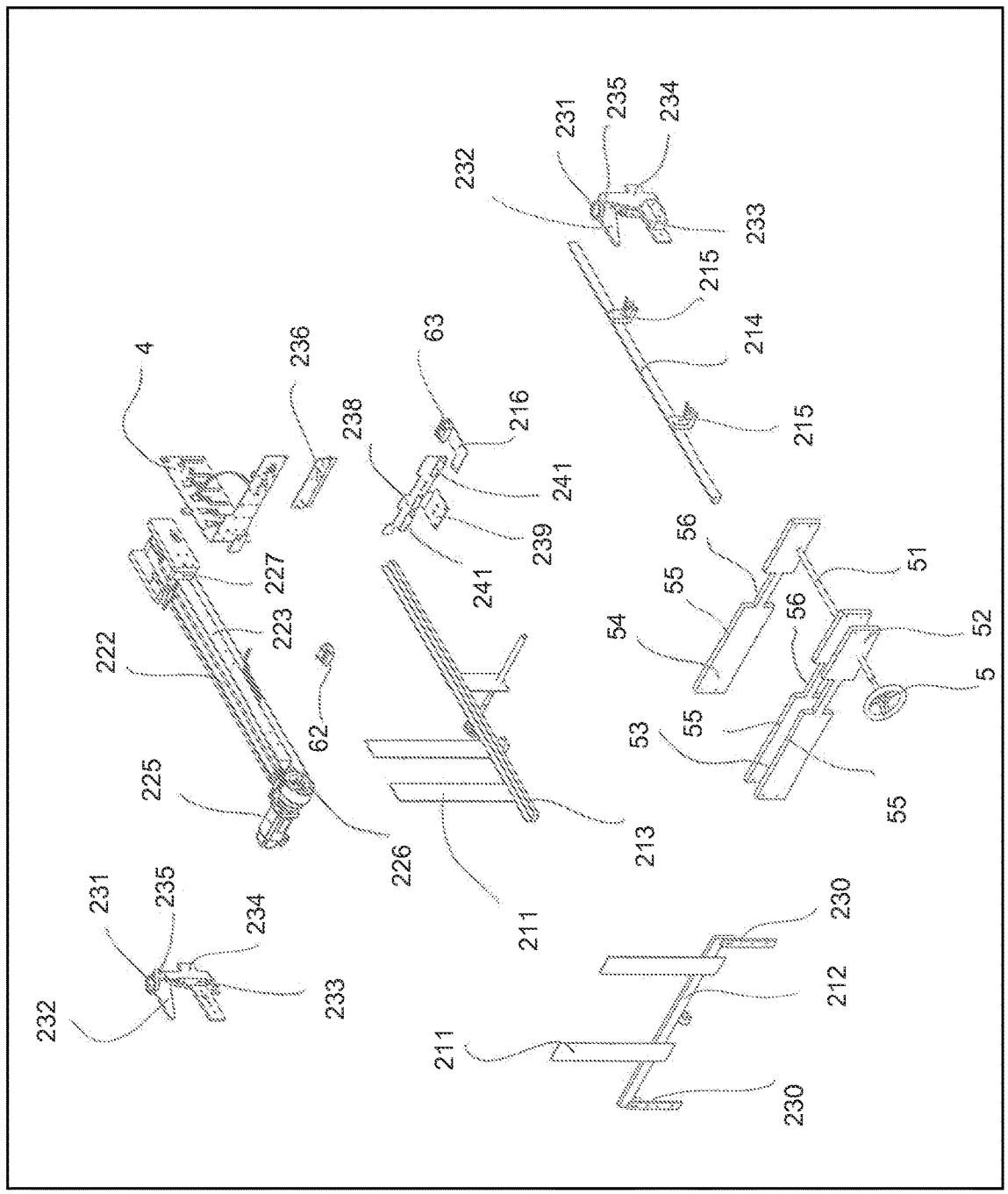
FIG. 5 is a structural view of components of the carton blank feeding system.
Figure 6:
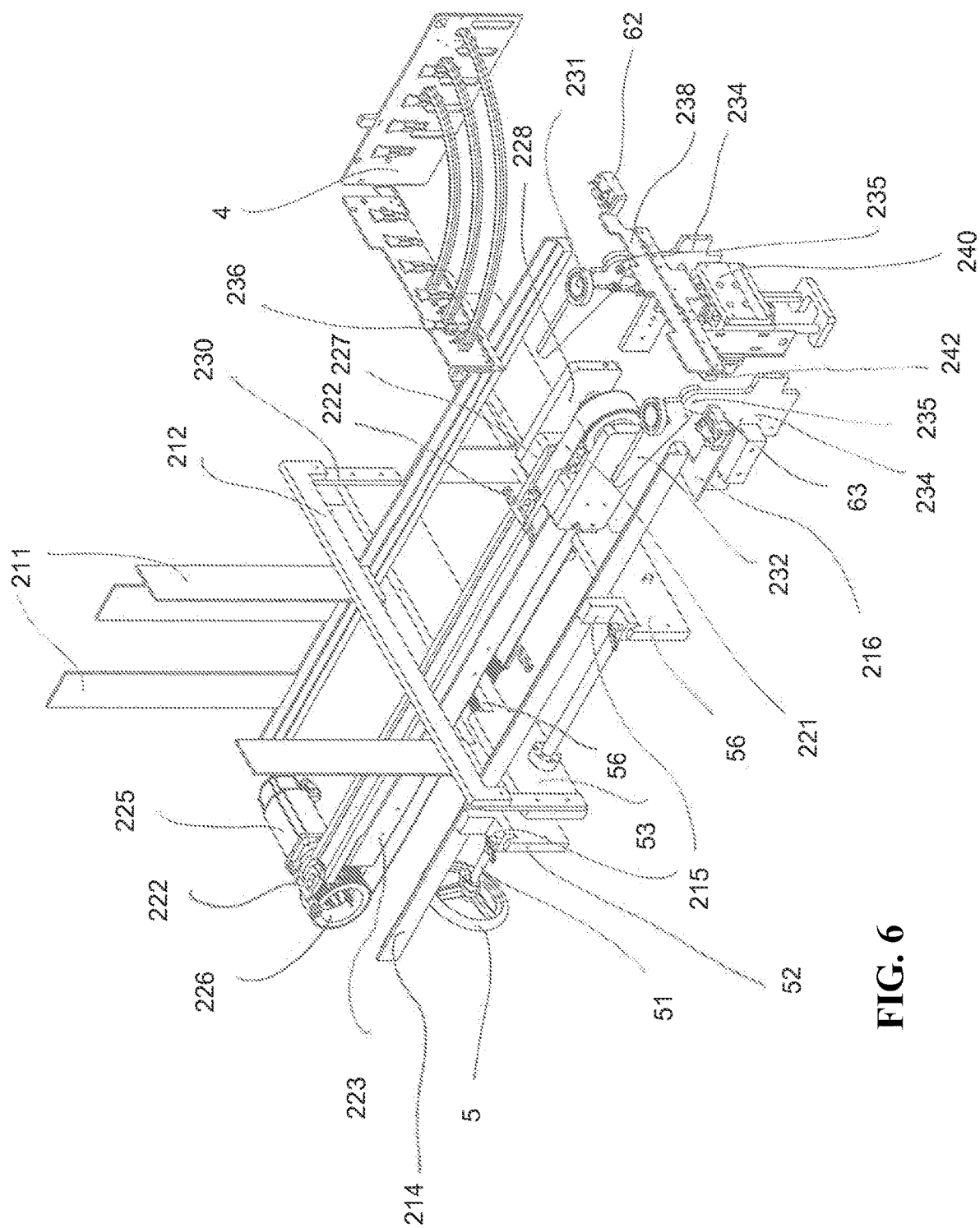
FIGS. 6-7 are perspective views of the carton blank feeding system.
Figure 7:
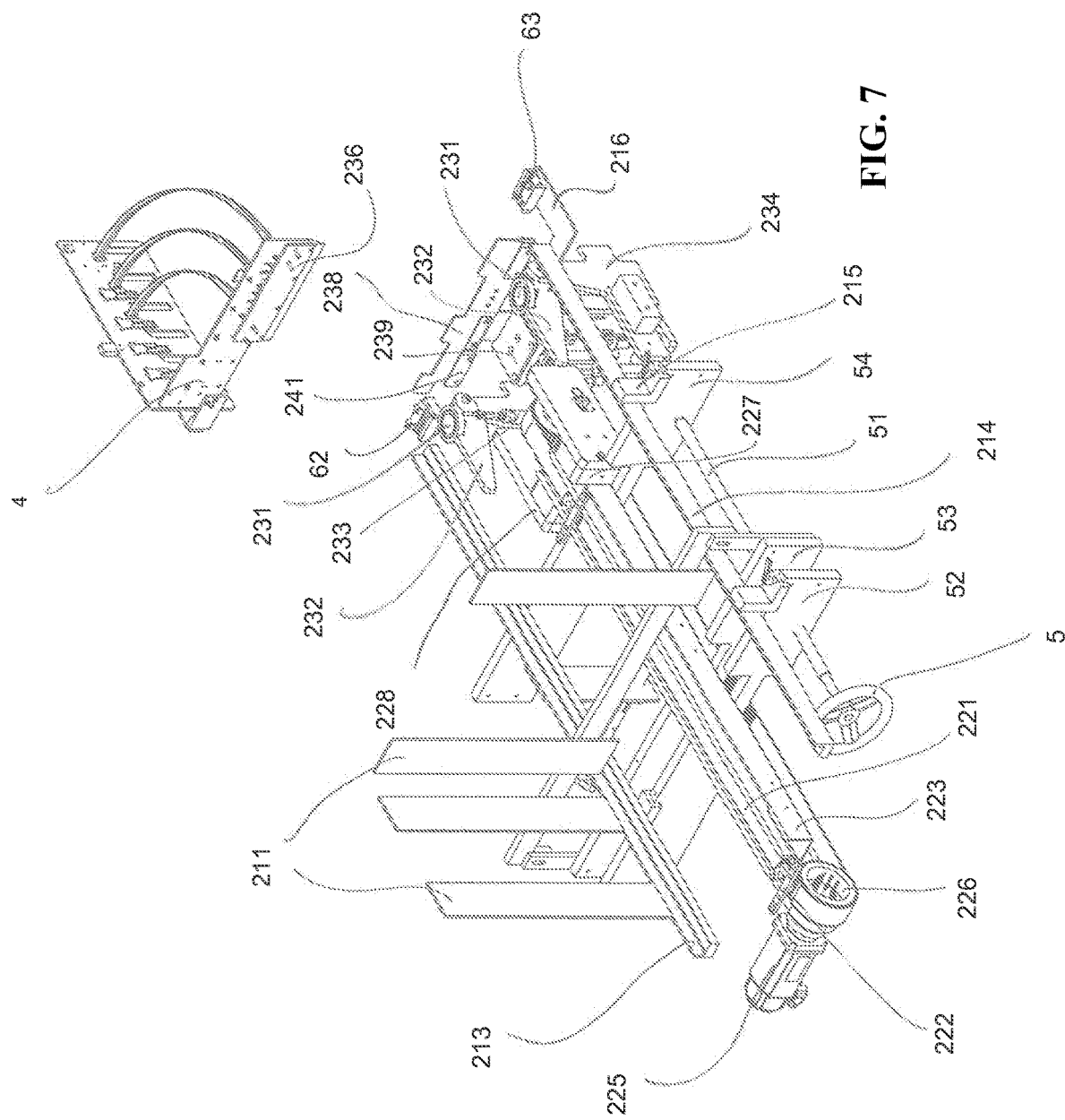
Figure 8:
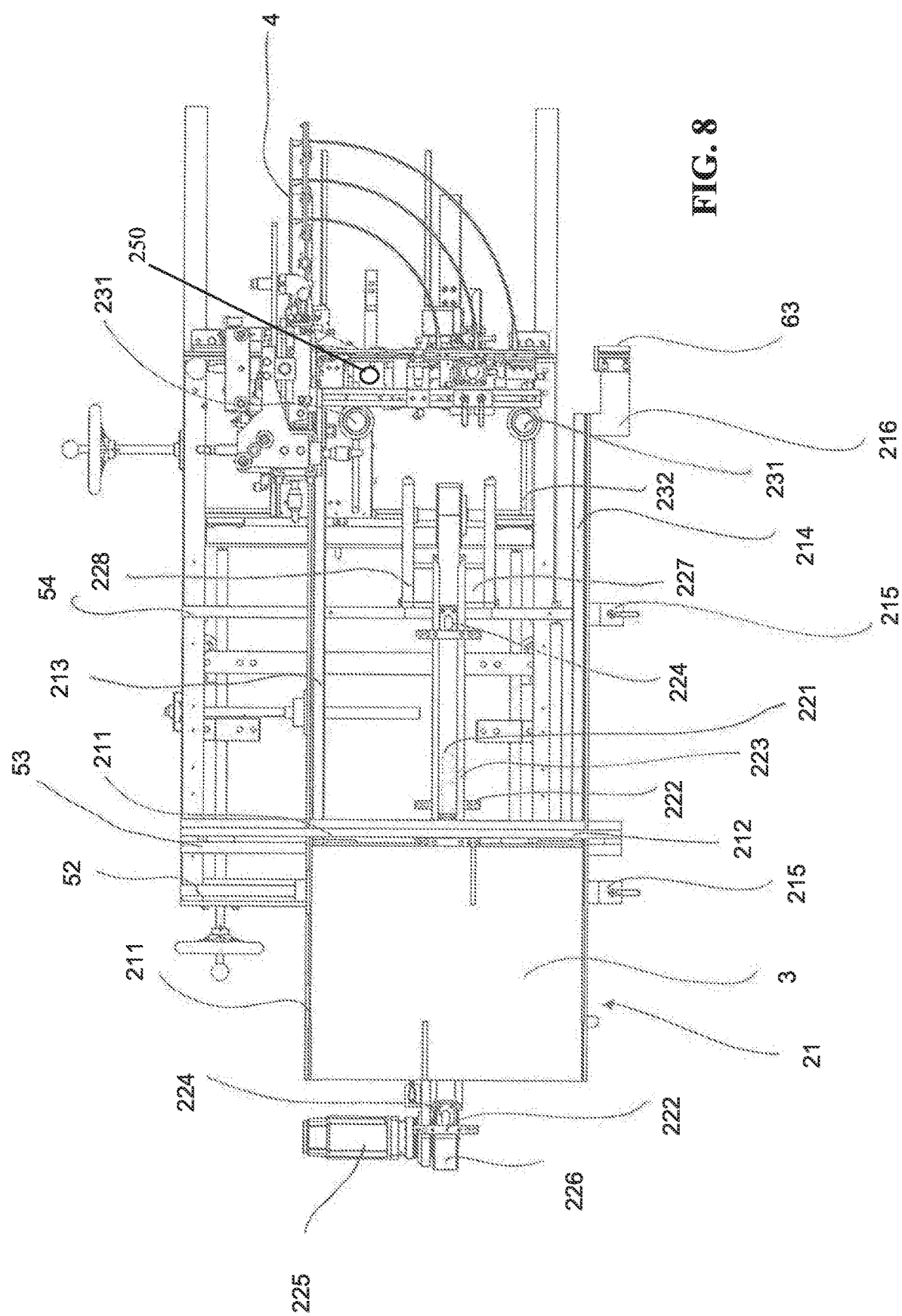
FIGS. 8 and 9 are top views of the carton blank feeding system showing transportation of carton blanks to the carton blanks erecting device.

FIGS. 5-7 show views of the carton blank feeding system 2. In FIG. 5, a hand wheel 5 is connected with a long screw shaft 51. The long screw shaft 51 pass through two "H" shaped flat plates 52 and 53, and at the end of the long screw shaft 51, an additional "H" shape flat plate 54 is mounted. As seen in FIG. 1, in the assembled device, the hand wheel 5 and "H" shaped flat plates 52, 53, 54 are located beneath/define a portion of the carton blank storage rack 21. The hand wheel 5 is used to adjust the size of the folded carton blank rack 21 by moving forward and backward of the long screw shaft 51. As the long screw shaft 51 is connected with the "H" shape flat plate 53, the movement of the long screw shaft 51 moves the "H" shape flat plate 53 simultaneously.

At the top side of the three "H" shaped flat plates 52, 53, 54, a hole 55 is provided. The hole 55 is matched with the hole (not shown in the drawings) on the "L" shape metal plate 213. Screws may be used to mount the "L" shape metal plate 213 on all the three "H" shape flat plates 52, 53, 54 via the holes 55. Beyond the downstream end of "L" shape metal plate 213, an adjustable stopper 62 is mounted on a metal flat plate (not shown in the drawings), and the metal flat plate is fixed on the body frame of the machine. In the figures, another two long, flat metal bars 211 are mounted vertically on a horizontal metal plate 212 and both ends of the horizontal metal plate 212 have small flat bars 230 connected thereto. The small flat bars 230 are fixed to the "H" shape flat plate 53. The "L" shape metal plate 214 has two "L" shape metal connectors 215, the first "L" shape metal connector 215 mounted on the "H" shape flat plate 52. The second "L" shape metal connector 215 mounted on the "H" shape flat plate 54. The whole carton blank transport device 22 (i.e., the assembly shown in FIG. 4) is placed in the groove 56 of the "H" shape flat plates 52, 53, 54. At the end position of the "L" shape metal plate 214 proximate to the carton blank push up device 23, a small bended metal plate 216 is mounted and a dual rod cylinder 63 is fixed on the small bended metal plate 216.

Referring to FIGS. 5, 6, and 7, the carton blank push up device 23, includes two suction cups 231, which are mounted on the top ends of two triangular shaped metal plates 232. The triangular shaped metal plates 232 are connected with pneumatic cylinders 233. At the side of the triangular shaped metal plates 232, a "t" shape flat plate 234 is mounted through a hole 235. The "t" shape plates 234 allow the triangular shaped metal plates 232 to move up and down in a pivotal motion about the mount at hole 235, controlled by the pneumatic cylinders 233. In between the two suction cups 231, a flat metal plate 238 is mounted via a small square plate 239 to a stand 240. On the flat metal plate 238, small rectangular "⌐" shaped bars 241 are mounted to form a groove or slot 242 relative to plate 238 (best seen in FIG. 6). In FIGS. 6 and 7, the carton blank push up device 23 is mounted on the body frame that is located close to the downstream end of the carton blank transport device 22. Between the two suction cups 231 is the flat plate 238 with small rectangular "⌐" shaped bars 241 forming a groove 242. Flat plate 238, bars 241, and the defined slot/groove 242 operate as one embodiment of a lift rail previously described above. At respective sides of the flat plate 238 is the adjustable stopper 62 and the dual rod cylinder 63.

Figure 11:
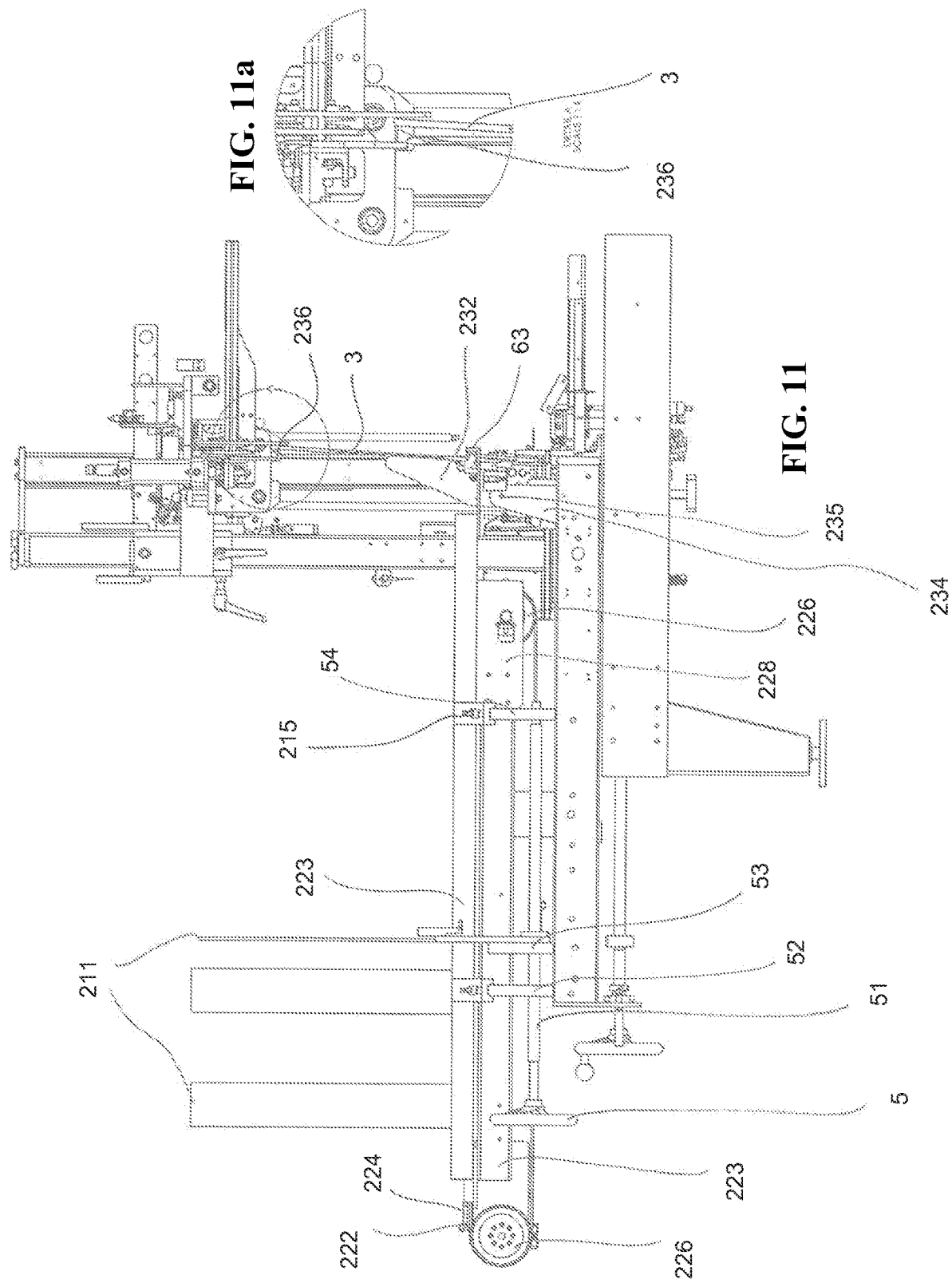

On the top of the carton blank push up device 23 is the jaw plate 4. On the jaw plate 4, a metal plate 236 is mounted. The metal plate 236 is used to prevent the upright folded carton blank 3 from falling back after the suction cups 231 release the folded carton blank 3, as seen in FIGS. 11, 11a and shown schematically in FIG. 13b. In addition, the adjustable stopper 62 is mounted on the body frame and adjusted to a position that is under the pin block set 41. After the folded carton blank 3 stands upright, the dual rod cylinder 63 will push the side of the folded blank 3 to ensure it is under the pin block set 41. Then, the metal plate 236 will hold the folded carton blank 3 in an upright position for the pins on the jaw plate 4 to insert into the flaps of the carton blank 3 and stretch open the carton box.

Figure 9:
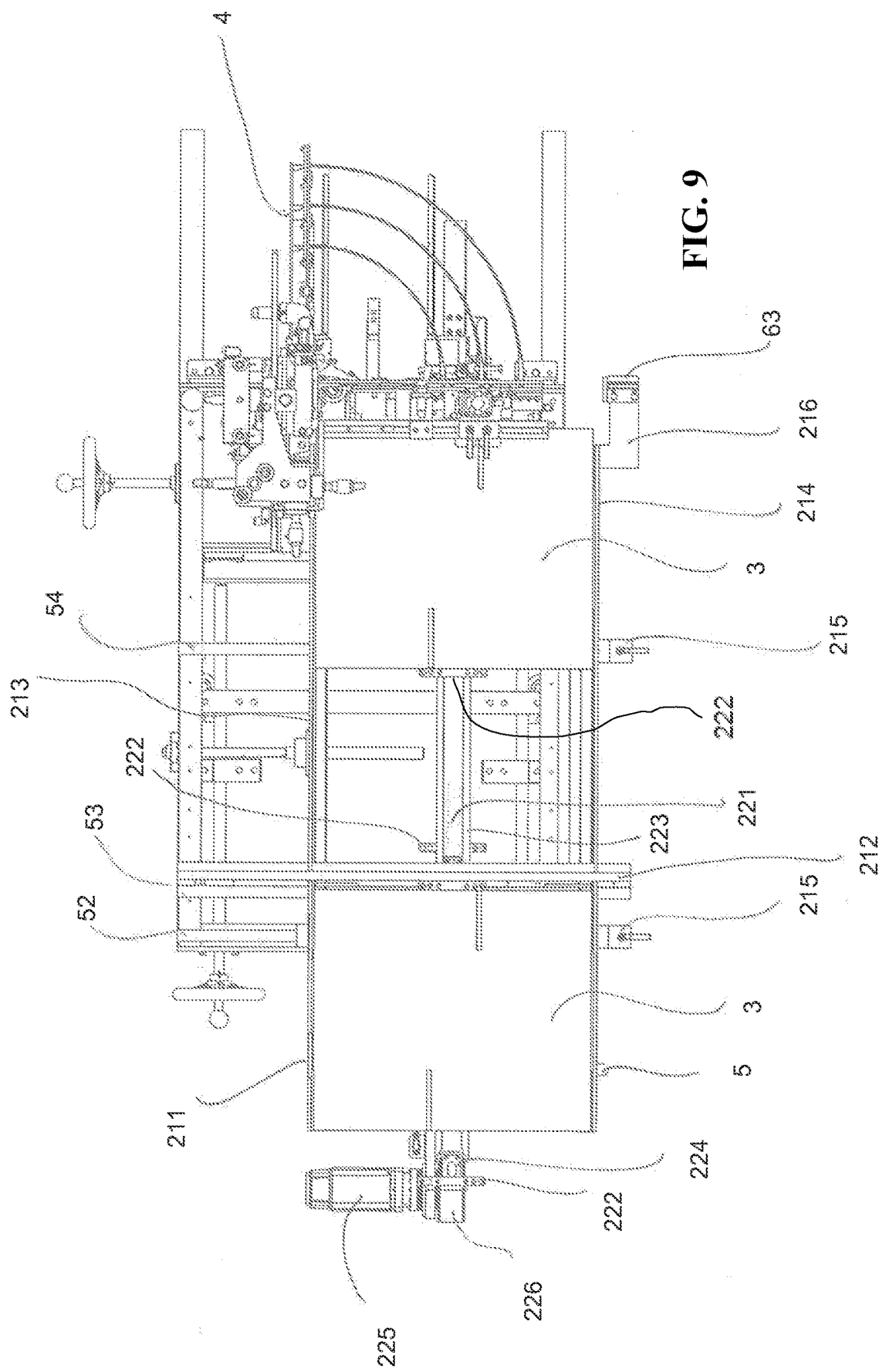

FIGS. 8-11a show in-process, operational views of the carton forming and sealing machine 1. In the top plan view of FIG. 8, a stack of horizontal folded carton blanks 3 is placed in the carton blank storage rack 21. In FIG. 9, when the motor 225 is turned on, the gear 226 will start to run and drive the conveyor belt 221 to move forward. The lugs 222 mounted on the conveyor belt 221 will knock down the bottom folded carton blank 3 from the stack and push the bottommost carton blank to the carton blank push up device 23.

Figure 10:
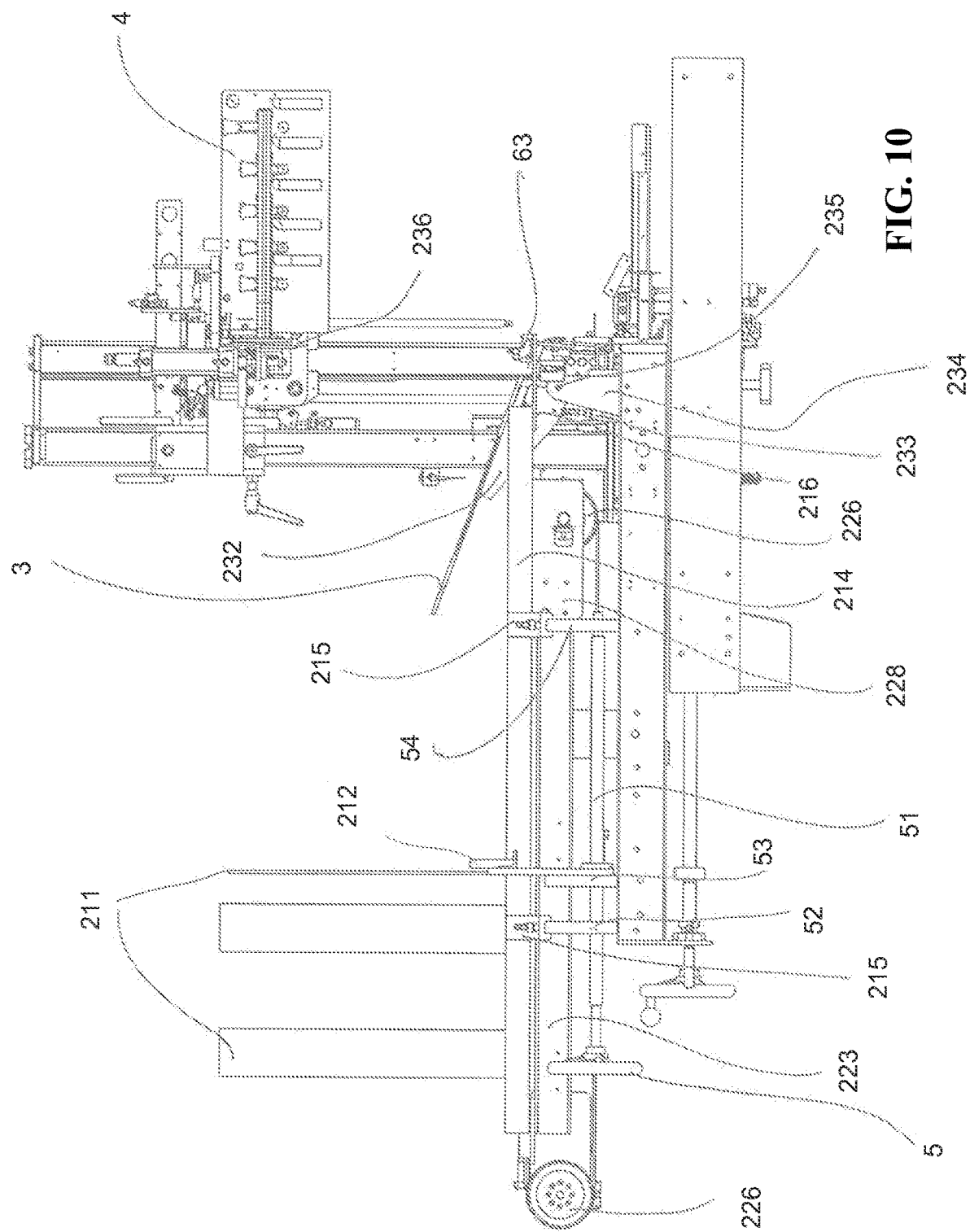

FIG. 10 provides a side view showing how a folded carton blank 3 is pushed upwards (via a pivot operation of plates 232 and suction cups 231) to the pin block set 4. A sensor 250 (see FIG. 8) detects positioning of the folded carton blank 3 in abutting engagement with or in close proximity to the carton blank lift rail, and the sensor triggers operation of the pivot device to pivot the folded carton blank upward. In FIG. 10, the carton blank 3 is only partially raised, and has not yet reached a fully vertical position. In detail, after the conveyor belt 221 transports the carton blank 3 to the carton blank push up device 23, the suction cups 231 will attach on the bottom side of the folded carton blank 3 and apply suction force to firmly hold the carton blank 3. At the same time, the pneumatic cylinders 233 which are mounted on the triangular shaped metal plates 232 will push the triangular shaped metal plates 232 so as to pivot them upward to make the folded carton blank 3 stand vertically, and the bottom flaps of the carton blank 3 will be pushed into the groove 242 of the flat plate 238, enabling the folded carton blank to stand still under the jaw plate 4.

Referring now to FIG. 11, the folded carton blank 3 stands vertically inside the groove 242 (FIG. 6) under the jaw plate 4. At the same time, in order to assure that the folded blank is the correct position, the adjustable stopper 62, which is mounted on a metal flat plate 61, is already adjusted to the required position under the jaw plate 4. The dual rod cylinder 63 mounted on the "L" shape metal plate 214 will push the side of the folded carton blanks 3 towards the adjustable stopper 62 to ensure the blank is under the jaw plate 4, and the metal plate 236 mounted on the jaw plate 4 will prevent the folded carton blank 3 from falling backwards after the blank has been raised to the vertical position. FIG. 11a is a detail view of the metal plate 236. Once the metal plate 236 has engaged the carton blank 3, the two suction cups 231 pivot back down to the horizontal position so as to be ready for receiving another folded blank. Then, the flat metal plate 238 with small square plate 239, which is mounted on a stand 240, will lift upwards and push the flaps of the blank towards the pins mounted on the jaw plate 4, The pins will insert into the flaps of the carton blanks and stretch open the folded carton blank 3 into an unfolded, rectangular form.

After the blank has been opened, the jaw mechanism 4 then moves the box downward into a flap folding station 42 at which the downwardly extending flaps of the carton or folded upward to close the bottom of the carton. The jaw mechanism 4 moves upward while the carton remains at station 42 and the opened carton is then conveyed to a downstream tape sealing device 43, where tape is automatically applied to the bottom of the carton to hold the bottom flaps closed. The box is then ready for manual or automated loading with product.

It is to be clearly understood that the above description is intended by way of illustration and example only, is not intended to be taken by way of limitation, and that other changes and modifications are possible.

What is claimed is:

1. A carton feed assembly for delivering folded cartons to a carton erecting mechanism, comprising:
    a carton blank storage rack holding a carton blank stack formed by plurality of folded carton blanks, the folded carton blanks stacked vertically one atop another such that additional folded carton blanks can be added to the top of the carton blank stack;

a carton blank transport device arranged below the carton blank stack and configured to pick a bottommost folded carton blank from the bottom of the stack and transport it along a horizontal conveyance path toward a carton erecting mechanism while the folded carton blank remains folded; and a carton blank push up device toward an end of the horizontal conveyance path that receives the folded carton blank and reorients the folded carton blank from a substantially horizontal orientation to an upright orientation, wherein the folded carton blank remains folded while moving from the substantially horizontal orientation into the upright orientation;

wherein the carton blank transport device includes a push lug that is moved along the horizontal conveyance path beneath the stack by a loop conveyor and the push lug engages an edge of the bottommost folded carton blank to move the bottommost folded carton blank from the bottom of the stack and along the horizontal conveyance path;

wherein the carton blank push up device includes at least one movable suction member having a down orientation and an up orientation, in the down orientation the suction member is arranged below the horizontal conveyance path to engage the bottom side of the folded carton blank when in the substantially horizontal orientation at the end of the horizontal conveyance path, in the up orientation the suction member is pivoted upward to reorient the folded carton blank from the substantially horizontal orientation to the upright orientation.

2. The carton feed assembly of claim 1 wherein:

the folded carton blanks are each substantially horizontal in the carton blank stack;

the carton blank storage rack includes at least one stop along the horizontal conveyance path, with a lower edge of the stop positioned to retain folded carton blanks that are above the bottommost folded carton blank as the push lug moves the bottommost folded carton blank below the lower edge of the stop.

3. The carton feed assembly of claim 2 wherein the carton blank storage rack includes one or more upright members that define a downstream edge of the storage rack and one or more upright members that define a side edge of the storage rack so as to provide a corner section into which folded carton blanks being added to the top of the stack can be pushed in order to properly orient the folded carton blanks.

4. The carton feed assembly of claim 1 wherein:

the carton blank push up device includes a lift rail having an upwardly facing slot that is positioned to receive downwardly extending flaps of the folded carton blank when it is reoriented to the upright position.

5. The carton feed assembly of claim 4 wherein the folded carton blank is delivered into abutting engagement with the lift rail by the carton blank transport device before the movable suction member moves from the down orientation to the up orientation.

6. The carton feed assembly of claim 4 wherein:

the carton blank push up device includes a retaining rail spaced vertically above the lift rail, the retaining rail movable between a raised position that allows the folded carton blank to clear a lower edge of the retaining rail when the carton blank is pivoted upward into the upright position, and a lowered position in which the lower edge of the retaining rail is moved downward alongside a top portion of the folded carton blank in the upright position and at the upstream side of the folded carton blank relative to the conveyance direction so as to prevent the folded carton blank from pivoting back downward when the movable suction member releases the folded carton blank and pivots back down to its down orientation.

7. The carton feed assembly of claim 6 wherein the lift rail is movable from a lowered position in which it receives the folded carton blank in upright orientation and a raised position that pushed the folded carton blank up into engagement with the carton erecting mechanism.

8. A carton forming and sealing machine, comprising:

the carton feed assembly of claim 1;

a carton erecting mechanism that receives folded carton blanks from the carton feed assembly and unfolds them into erected condition; and a tape sealing device for sealing bottoms of erected cartons.

9. A carton feed assembly for delivering folded cartons to a carton erecting mechanism, comprising:

a carton blank transport device;

a carton blank lift rail including an upwardly facing slot;

a pivot device;

wherein the carton blank transport device is configured to move a substantially horizontally oriented folded carton blank along a horizontal conveyance path into abutting engagement with or close proximity to the carton blank lift rail while the folded carton blank remains folded, wherein the pivot device includes a pair of spaced apart triangular metal plates, each plate having a suction member mounted thereon, and the pivot device is movable to pivot the folded carton blank upward from the substantially horizontal orientation into an upright orientation in which a bottom edge of the folded carton blank seats into the upwardly facing slot of the carton blank lift rail, wherein the folded carton blank remains folded during movement from the substantially horizontal orientation to the upright orientation and remains folded when the bottom edge seats into the upwardly facing slot of the carton blank lift rail with the folded carton blank in the upright orientation.

10. The carton feed assembly of claim 9 further comprising a sensor that detects positioning of the folded carton blank in abutting engagement with or close proximity to the carton blank lift rail, wherein the sensor triggers operation of the pivot device to pivot the folded carton blank upward.

11. The carton feed assembly of claim 9 wherein the pivot device is movable from a lowered position in which it receives the folded carton blank in the substantially horizontal orientation and a raised position that pushes the folded carton blank up into engagement with a carton erecting mechanism.

12. The carton feed assembly of claim 9, further comprising:

a retaining rail spaced vertically above the lift rail, the retaining rail movable between a raised position and a lowered position, the raised position allows the folded carton blank to clear a lower edge of the retaining rail when the folded carton blank is pivoted upward into the upright position, in the lowered position the lower edge of the retaining rail is moved downward alongside a top portion of the folded carton blank in the upright position and at the upstream side of the folded carton blank relative to the conveyance direction so as to prevent the folded carton blank from pivoting back downward toward the horizontal conveyance path.

13. The carton feed assembly of claim 9, further comprising:
a carton blank storage rack holding a carton blank stack formed by plurality of folded carton blanks, the folded carton blanks stacked vertically one atop another such that additional folded carton blanks can be added to the top of the carton blank stack;
the carton blank transport device passes below the carton blank stack to pick a bottommost folded carton blank from the bottom of the stack and transport it along the horizontal conveyance path.

14. The carton feed assembly of claim 13, wherein the carton blank transport device includes a push lug that engages an edge of the folded carton blank in order to pick the folded carton blank from the bottom of the stack and multiple rails that support the folded carton blank as it moves along the horizontal conveyance path.

15. A carton forming and sealing machine, comprising:
the carton feed assembly of claim 9;
a carton erecting mechanism that receives folded carton blanks from the carton feed assembly and unfolds them into erected condition; and
a tape sealing device for sealing bottoms of erected cartons.

16. A method of handling carton blanks in a carton forming and sealing machine, the method comprising:
(a) storing a plurality of substantially horizontally oriented folded carton blanks in a stack at a carton blank station;
(b) automatically picking a folded carton blank from the bottom of the stack and conveying it in a substantially horizontal orientation along a horizontal conveyance path in a horizontal conveyance direction toward a carton erecting mechanism while the folded carton blank remains folded and with first flaps of the folded carton blank extending in the conveyance direction and second flaps of the folded carton blank extending opposite the conveyance direction, wherein free ends of the first flaps form a leading edge of the folded carton blank and free ends of the second flaps form a trailing edge of the folded carton blank, wherein a push lug carried by a loop conveyor engages the trailing edge of the folded carton blank in order to pick the folded carton blank from the bottom of the stack and to push the folded carton blank along the horizontal conveyance path; and
(c) automatically pivoting the folded carton blank of step (b) to move the folded carton blank from the substantially horizontal orientation upward into an upright orientation, wherein the folded carton blank remains folded during movement from the substantially horizontal orientation to the upright orientation and the folded carton blank attains the upright orientation before opening the folded carton blank, wherein, in the upright orientation, the second flaps extend downward and the first flaps extend upward, wherein the pivoting is carried out by a carton blank push up device that includes at least one movable suction member having a down orientation and an up orientation, in the down orientation the suction member is arranged below the horizontal conveyance path, in the up orientation the suction member is pivoted upward.

17. The method of claim 16, further comprising:
repeating steps (b) and (c) for multiple folded carton blanks in the stack; and
loading more folded carton blanks at the carton blank loading station by adding folded carton blanks to the top of the carton blank stack while steps (b) and (c) are continuously carried out in a repeated manner.

18. The method of claim 16 wherein in step (c) the pivoting operation loads the folded carton blank into a receiving slot in a lift rail, with the ends of the flaps positioned within the receiving slot, the method further comprises:
(d) moving the lift rail upward to push the folded carton blank into engagement with a carton erecting mechanism that operates to open the folded carton blank.

19. A carton feed assembly for delivering folded cartons to a carton erecting mechanism, comprising:
a carton blank transport device;
a carton blank lift rail including an upwardly facing slot;
a pivot device;
wherein the carton blank transport device is configured to move a substantially horizontally oriented folded carton blank along a substantially horizontal conveyance path into abutting engagement with the carton blank lift rail while the folded carton blank remains folded, wherein first flaps of the folded carton blank extend in a conveyance direction of the conveyance path and second flaps of the folded carton blank extend in a direction opposite the conveyance direction, wherein the carton blank transport device moves free ends of the first flaps into engagement with the carton blank lift rail, wherein the pivot device is movable to pivot the folded carton blank upward from the substantially horizontal orientation into an upright orientation in which the first flaps of the folded carton blank seat into the upwardly facing slot of the carton blank lift rail and the second flaps of the folded carton blank extend upward, wherein the folded carton blank remains folded during movement from the substantially horizontal orientation to the upright orientation and remains folded when the first flaps seat into the upwardly facing slot of the carton blank lift rail with the folded carton blank in the upright orientation;
wherein the carton blank lift rail is movable vertically to raise the upright carton blank, while the upright carton blank is in the upright orientation, before the upright carton blank is opened.

* * * * *